(12) United States Patent
Kojima et al.

(10) Patent No.: US 7,992,834 B2
(45) Date of Patent: Aug. 9, 2011

(54) VEHICLE SEAT SLIDING APPARATUS

(75) Inventors: Yasuhiro Kojima, West Bloomfield, MI (US); Hideo Nihonmatsu, Anjo (JP); Ryousuke Mizuno, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/569,426

(22) Filed: Sep. 29, 2009

(65) Prior Publication Data

US 2010/0090083 A1    Apr. 15, 2010

(30) Foreign Application Priority Data

Oct. 15, 2008 (JP) .................................. 2008-266642

(51) Int. Cl.
*F16M 13/00*    (2006.01)
(52) U.S. Cl. .......................... 248/429; 248/424; 248/430
(58) Field of Classification Search .................. 248/429, 248/424, 430, 345.1
See application file for complete search history.

(56) References Cited

U.S. PATENT DOCUMENTS

| 5,242,143 A | | 9/1993 | Nagashima et al. |
| 5,275,369 A | * | 1/1994 | Kamata et al. ............. 248/345.1 |
| 5,454,541 A | * | 10/1995 | Ito ................................. 248/430 |
| 5,482,243 A | * | 1/1996 | Minder ....................... 248/345.1 |

FOREIGN PATENT DOCUMENTS

| FR | 2 746 721 A1 | 10/1997 |
| JP | 2006-298104 | 11/2006 |

* cited by examiner

*Primary Examiner* — Anita M King
(74) *Attorney, Agent, or Firm* — Oblon, Spivak, McClelland, Maier & Neustadt, L.L.P.

(57) ABSTRACT

In a vehicle seat sliding apparatus including first and second rails, one of which is movable relative to the other within a range restricted by engagement between raised tabs of the first and second rails, a cover member is provided at an end of the upper rail. The cover extends into the upper rail along its lengthwise direction to reach a portion at which the raised tab of the upper rail. The cover is provided with an extension extending to the raised tab of the upper rail.

6 Claims, 2 Drawing Sheets

WIDTHWISE DIRECTION

VEHICLE SEAT SLIDING APPARATUS

CROSS REFERENCE TO RELATED APPLICATION

This application is based on and claims priority under 35 U.S.C. Section 119 to Japanese Patent Application No. 2008-266642 filed on Oct. 15, 2008, the entire content of which is incorporated herein by reference.

BACKGROUND OF THE INVENTION

1. Field of the Invention

The present invention relates to a vehicle seat sliding apparatus.

2. Description of the Related Art

In the related art, for example, a vehicle seat sliding apparatus as disclosed in JP-A-2006-298104 (FIG. 7 to FIG. 8) is known. This vehicle seat sliding apparatus includes a lower rail adapted to be fixed to a vehicle-floor, and an upper rail adapted to be fixed to a seat cushion and supported so as to be movable relative to the lower rail. Then, the lower rail is provided at a center portion thereof in terms of the longitudinal direction with a cut-and-raised strip which is formed by cutting and raising obliquely from a bottom wall portion. In contrast, the upper rail is provided at front and rear end portions thereof with cut-and-raised strips formed by cutting and raising obliquely from a vertical wall portion (32). The cut-and-raised strips are arranged so that parts of the respective opposed surfaces opposing in terms of the direction of movement of the upper rail are able to abut thereto, and restricts the movable range (slide stroke) of the upper rail with respect to the lower rail by being engaged in association with the movement of the upper rail.

Incidentally, according to the vehicle seat sliding apparatus, for example, the cut-and-raised strips disposed at the front and rear end portions of the upper rail are exposed and may interfere with peripheral components depending on the relative position of the upper rail with respect to the lower rail such that the front end portion or the rear end portion of the upper rail projects from the lower rail.

SUMMARY OF THE INVENTION

Thus, a need exists for a vehicle seat sliding apparatus which is not susceptible to the drawback mentioned above.

In order to solve the drawback mentioned above, a first aspect of the invention provides a vehicle seat sliding apparatus including: a first rail adapted to be fixed to either one of a vehicle-floor and a seat cushion; a second rail adapted to be connected to the first rail so as to be movable relatively therewith so as to be fixed to the other of the vehicle-floor and the seat cushion and provided with a pair of side wall portions arranged in parallel on both sides in terms of the widthwise direction and a connecting wall portion being opposed to the first rail in terms of the vehicle height direction and connecting proximal ends of the both side wall portions apart from the first rail; a projecting portion provided at an end portion of the second rail in terms of the longitudinal direction at an end portion of an opening formed by distal end portions of the side wall portions so as to project between the both side wall portions in terms of the widthwise direction of the second rail; and a cover adapted to be mounted on the second rail and to close a terminal end of the second rail, wherein the cover includes an extending portion extending to a portion where the projecting portion is formed in the longitudinal direction of the second rail and projecting toward the opening to a distal end of the projecting portion in terms of the direction of opening of the second rail.

DESCRIPTION OF THE PREFERRED EMBODIMENTS

Figure 1:
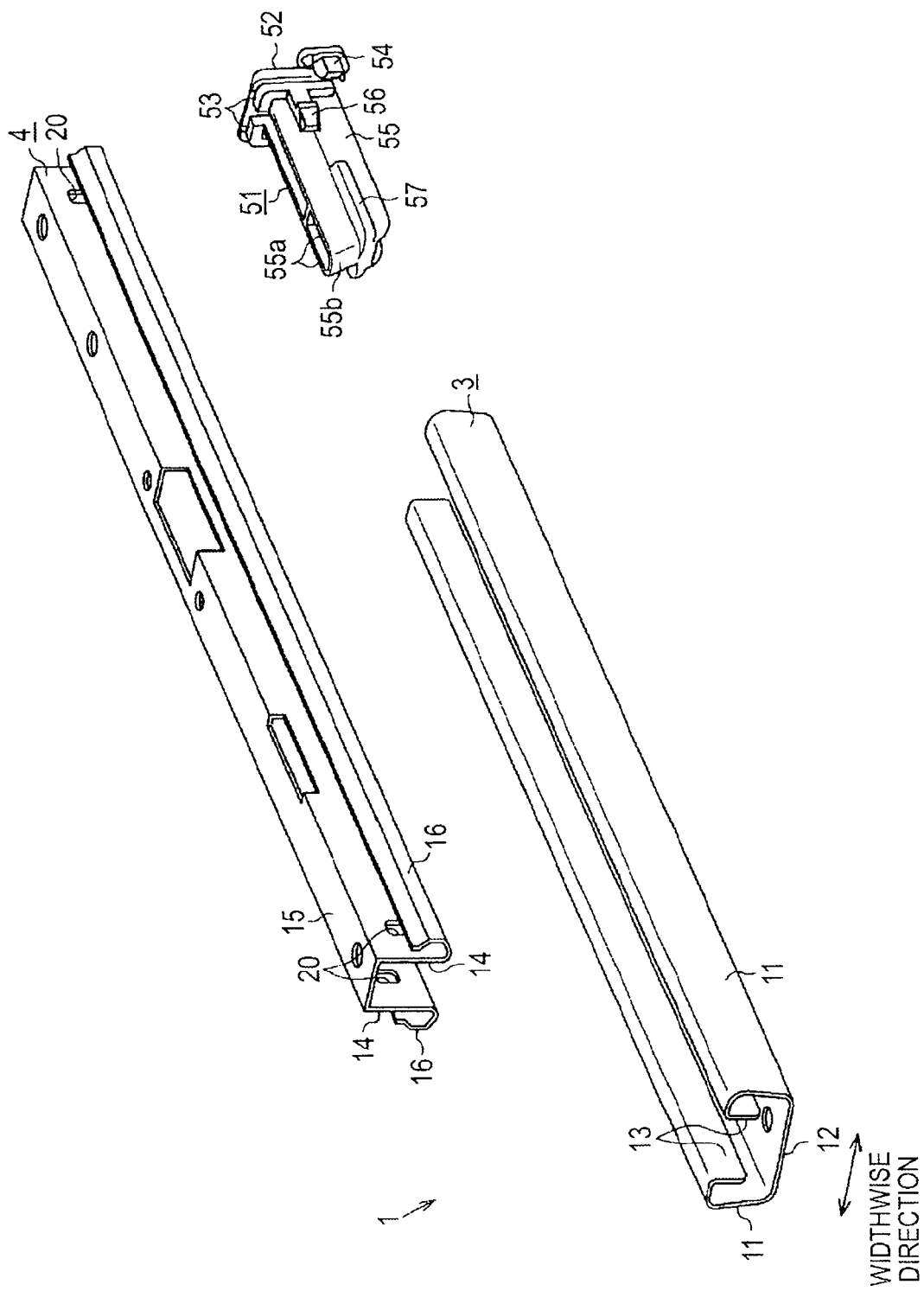
FIG. 1 is an exploded perspective view showing an embodiment of the invention.

Referring now to the drawings, an embodiment in which the invention is embodied will be described below.

Figure 2:
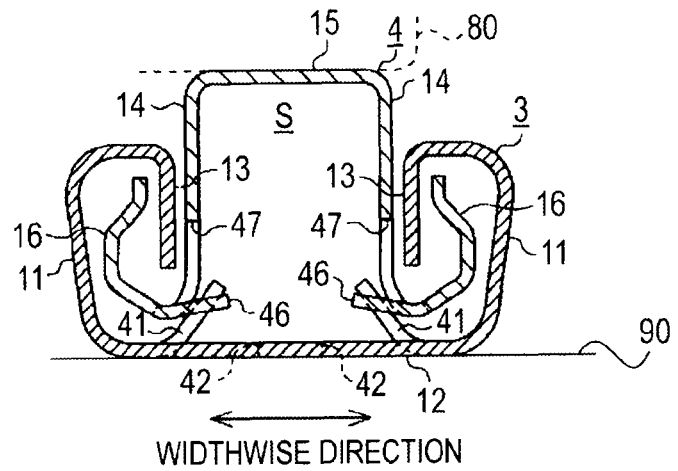
FIG. 2 is a cross-sectional view showing the same embodiment.

FIG. 1 and FIG. 2 are a perspective view and a cross-sectional view showing a vehicle seat sliding apparatus 1 according to the embodiment which is mounted on a vehicle such as an automotive vehicle, for example. As illustrated in these drawings, a lower rail 3 as a first rail is fixed to a vehicle floor 90 extending in the fore-and-aft direction of the vehicle, and an upper rail 4 as a second rail is mounted to the lower rail 3 so as to be movable relative to the lower rail 3. A seat cushion 80 is fixed to the upper rail 4.

The lower rail 3 and the upper rail 4 are disposed in pairs respectively in the widthwise direction of the vehicle seat cushion 80. Then, a seat cushion which forms a seating portion for an occupant is fixed to and supported by the both upper rails 4. The relative movement of the lower rail 3 and the upper rail 4 is normally restricted by a locking member (not shown), and the restriction is released by applying an operating force to the locking member.

The lower rail 3 includes a pair of side wall portions 11 extending upright from both sides thereof in terms of the widthwise direction and a bottom wall portion 12 which connects proximal ends (lower ends) of the side wall portions 11. Then, folded-back wall portions 13 which are formed to protrude inward in terms of the widthwise direction and then folded back toward the proximal end sides of the side wall portions 11 are formed continuously from distal ends (upper ends) of the respective side wall portions 11.

In contrast, the upper rail 4 includes a pair of side wall portions 14 extending in the vertical direction between the both folded-back wall portions 13 of the lower rail 3 and a lid wall portion 15 as a connecting wall portion connecting proximal ends (upper ends) apart from the lower rail 3 of the side wall portions 14. Then, folded-back wall portions 16 which are formed to protrude outward in terms of the widthwise direction and then folded so as to be surrounded by the side wall portions 11 and the folded-back wall portions 13 are formed continuously from distal ends (lower ends) of the respective side wall portions 14.

In other words, the lower rail 3 and the upper rail 4 each include a U-shaped cross section of the rail with opening sides butted against to each other, and are held so as not to come apart from each other in the vertical direction mainly by the engagement of the folded-back wall portions 13 and 16. The cross section of the rail formed by the lower rail 3 and the upper rail 4 assumes a box shape in a rectangular shape. The lower rail 3 defines an internal space S in cooperation with the upper rail 4 (see FIG. 2). The lower rail 3 is fixed to a vehicle floor by a bolt 60 (see FIG. 3C) as a tightening member arranged at a center portion of the bottom wall portion 12 in terms of the widthwise direction, and a pan-shaped head portion 60a of the bolt 60 projects into the internal space S.

Rolling elements (not shown) are mounted between the respective folded-back wall portions 16 and the side wall portions 11 opposing thereto, and the upper rail 4 is supported so as to be slidable in the longitudinal direction (the fore-and-aft direction of the vehicle) with respect to the lower rail 3 in a state of rolling the rolling elements with respect to the lower rail 3.

As shown in FIG. 2, the lower rail 3 is formed with a pair of cut-and-raised strips 41 as stopper portions arranged on the bottom wall portion 12 symmetrically in terms of the widthwise direction at a center portion in terms of the longitudinal direction of the lower rail 3. The pair of cut-and-raised strips 41 are cut and raised at a predetermined angle so as to assume the shape of slanting eyebrows reducing the distance toward the upper ends thereof, and project into the internal space S. Also, the respective cut-and-raised strips 41 extend in the longitudinal direction of the lower rail 3, that is, in the direction of the relative movements of the lower rail 3 and the upper rail 4. Then, incised portions 42 are formed in association with the formation of the cut-and-raised strips 41 (cut and raised portions) around the respective cut-and-raised strips 41.

In contrast, at both end portions of the upper rail 4 in terms of the longitudinal direction, a pair of projecting portions and cut-and-raised strips 46 as cut-and-raised portions arranged symmetrically in the widthwise direction are formed at a connecting portion between the side wall portions 14 and the folded-back wall portions 16. The pair of cut-and-raised strips 46 are cut and raised at a predetermined angle so as to assume the shape of flat slanting eyebrows reducing the distance toward the upper ends thereof, and project into the internal space S. Also, the respective cut-and-raised strips 46 extend in the direction of the relative movement of the lower rail 3 and the upper rail 4. Then, incised portions 47 are formed in association with the formation of the cut-and-raised strips 46 (cut and raised portions) around the respective cut-and-raised strips 46. The bolt 60 (head portion 60a) is arranged between the cut-and-raised strips 46 so as to oppose to each other in terms of the rail width direction.

The both cut-and-raised strips 41 and 46 are arranged so that the respective opposed surfaces are able to come into abutment with each other in the direction of the relative movement of the tower rail 3 and the upper rail 4. Therefore, the both cut-and-raised strips 41 and 46, being engaged with each other in association with the relative movement of the lower rail 3 and the upper rail 4, restrict the allowable range of relative movement of the lower rail 3 and the upper rail 4.

As shown in FIG. 1, the respective side wall portions 14 are formed with lock holes 20 opening in the rail width direction at both end portions thereof in terms of the longitudinal direction. Then, a resin-made cover 51 for closing the terminal end is mounted to the end portion of the upper rail 4 in terms of the longitudinal direction.

Figure 3A:
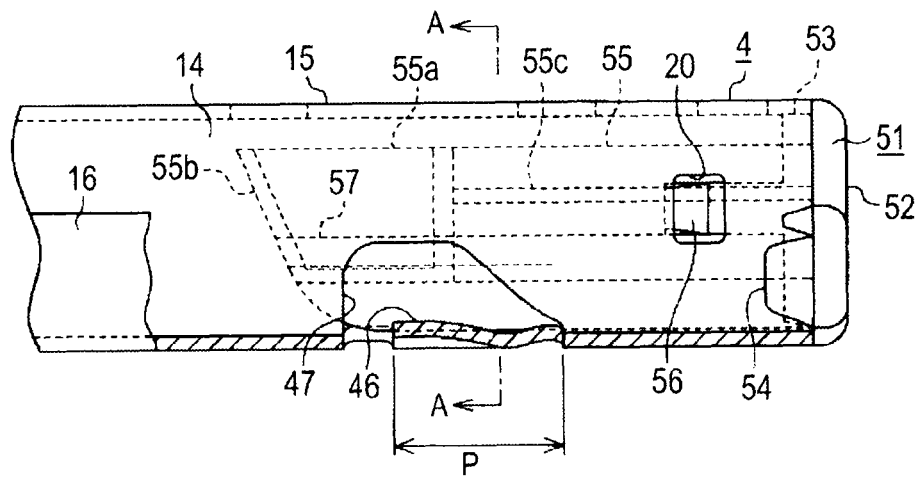
FIG. 3A is a side view showing the same embodiment.
Figure 3B:
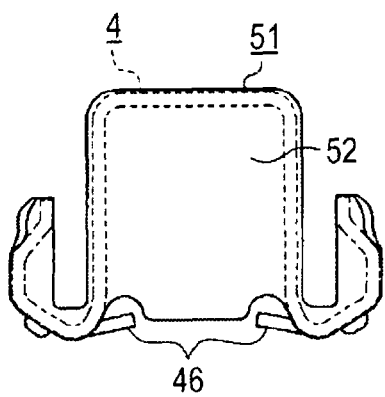
FIG. 3B is a front view of the same embodiment.
Figure 3C:
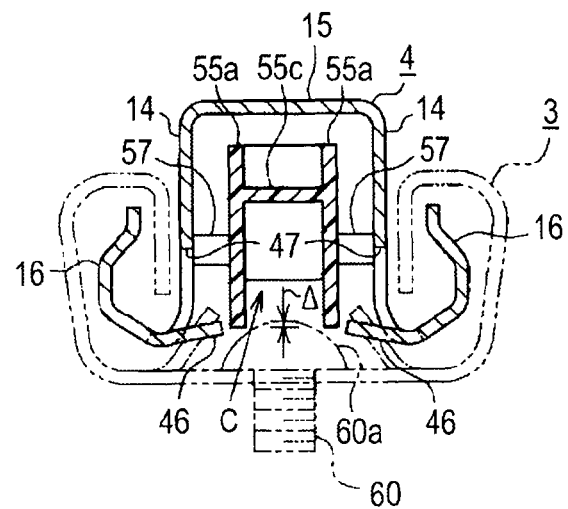
FIG. 3C is a cross-sectional view taken along the line A-A in FIG. 3A.

FIGS. 3A and 3B are a side view and a front view of the upper rail 4 on which the cover 51 is mounted, and FIG. 3C is a cross-sectional view taken along the line A-A in FIG. 3A. As shown in FIG. 1 and FIGS. 3A to 3C, the cover 51, having a symmetrical structure in terms of the tail width direction, has a plate-shaped cover portion 52 molded into a hat shape corresponding to a plane of projection thereof including an internal space when viewing the upper rail 4 in the longitudinal direction, and an L-shaped pair of fitting wall portions 53 each having an outer wall surface which can be fitted to a U-shape formed by an inner wall surface of the pair of side wall portion 14 and the lid wall portion 15 and projecting from the cover portion 52 along the longitudinal direction of the upper rail 4, and also includes a trapezoidal-shaped pair of fitting projections 54 each having an outer wall surface which can be fitted to a curved shape formed by an inner wall surface of the folded-back wall portion 16 and projecting from the cover portion 52 along the longitudinal direction of the upper rail 4.

The cover 51 includes a boat-shaped extending portion 55 projecting from the cover portion 52 along the longitudinal direction of the upper rail 4 inside the both fitting wall portions 53 in the rail width direction. In other words, the extending portion 55 includes a pair of side walls 55a arranged in parallel to the side wall portion 14 in the rail width direction, includes an arcuate-shaped distal end wall 55b connecting upper distal portions of the side walls 55a, and also includes a step-shaped connecting wall 55c extending in the longitudinal direction of the extending portion 55 at a midsection of a space formed between the distal end wall 55b and the cover portion 52 in terms of the height direction and connecting the both side walls 55a in the rail width direction.

Then, on outside surfaces on both sides of the extending portion 55 (both side walls 55a) in terms of the rail width direction, a pair of locking claws 56 extending in the longitudinal direction of the upper rail 4 from a midsection of the fitting wall portion 53 in terms of the height direction so as to be capable of fitting into the lock holes 20 are formed so as to project outward in terms of the rail width direction respectively. Also, on the outside surfaces of the extending portion 55 in terms of the rail width direction, a pair of ribs 57 extending in the longitudinal direction of the upper rail 4 on the distal end side, which corresponds to the lower side of the distal end wall 55b so as to be capable of press-fitting with an inner wall surface of the side wall portion 14 so as to project outward in terms of the rail with direction respectively.

Here, as shown in FIG. 3A, the extending portion 55 (both side walls 55a) of the cover 51 mounted on the upper rail 4 extends in the longitudinal direction of the upper rail 4 until a point P where the cut-and-raised strips 46 are formed including the entire cut-and-raised strips 46 in terms of the longitudinal direction of the upper rail 4, and projects toward the opening (downward) until distal ends of the cut-and-raised strips 46 in terms of the opening direction of the upper rail 4 as shown in FIG. 3C. Therefore, exposure of the distal ends (edges) of the cut-and-raised strips 46 is restrained by the extending portion 55.

As shown in FIG. 3C, since the both side walls 55a of the extending portion 55 are connected by the connecting wall 55c which is arranged at an upper level than the lower ends thereof, the extending portion 55 forms a step-shaped recess C depressed on the side opposite from the direction of opening of the upper rail 4 (the lid wall portion 15 side, that is, the side apart from the bottom wall portion 12 of the lower rail 3) at a center portion in terms of the widthwise direction. Therefore, for example, even though the head portion 60a of the bolt 60 projects upward by a minute distance A from a lower end of the cover 51 (both side walls 55a), interference with the head portion 60a is restrained by the recess C.

Subsequently, the mode of assembly of the cover 51 to the upper rail 4 will be described. When the cover 51 is inserted into the upper rail 4 along the longitudinal direction of the upper rail 4 from the terminal end side, the both ribs 57 slide along the inner wall surfaces of the side wall portions 14. When the both locking claws 56 enter the upper rail 4 in association with this, these locking claws 56 are resiliently deformed and slide along the inner wall surfaces of the side wall portions 14. Then, when the both locking claws 56 reach the lock holes 20 in association with the further entry to the upper rail 4, the both locking claws 56 are released from the side wall portions 14 and resiliently restored, and are fitted into the lock holes 20. Then, the cover 51 is locked on the upper rail 4. Simultaneously, the both fitting wall portions 53 of the cover 51 are fitted to a U-shape formed by inner wall surfaces of the pair of side wall portions 14 and the lid wall portion 15 and the both fitting projections 54 are fitted into a curved shape formed by the inner wall surfaces of the folded-back wall portions 16. Accordingly, the cover 51 is connected to the upper rail 4. At this time, the distal end surface at an terminal end of the upper rail 4 is covered by the cover portion 52 on the outside of the both fitting wall portions 53 and the fitting projection 54. Also, the distal ends (edges) of the both cut-and-raised strips 46 are covered with the extending portion 55 (both side walls 55a).

As described above in detail, the following advantages are achieved according to this embodiment.

(1) In this embodiment, exposure of the distal ends (edges) of the both cut-and-raised strips 46 can be restrained by the extending portion 55 of the cover 51, and hence interference or the like between the distal ends and peripheral components are restrained. In particular, it is effective in the case of a structure in which the distal end of the upper rail 4 in terms of the longitudinal direction projects from the lower rail 3 in association with the relative movement between the lower rail 3 and the upper rail 4.

(2) In this embodiment, since the center portion of the extending portion 55 in terms of the widthwise direction is retracted to the side opposite from the opening of the upper rail 4 (to the side apart from the bottom wall portion 12 of the lower rail 3, that is, the side of the lid wall portion 15) by the recess C, the both sides (both side walls 55a) of the recess C in terms of the widthwise direction projects sufficiently toward the opening of the upper rail 4 while restraining interference between the head portion 60a of the bolt 60 which can be opposed to the opening, so that the exposure of the distal ends of the both cut-and-raised strips 46 can be restrained reliably.

(3) In this embodiment, since the distal end surface of the terminal end of the upper rail 4 is covered with the cover portion 52, the appearance is improved. Also, since the pair of locking claws 56 and the pair of ribs 57 engage the both side wall portions 14, the cover 51 can be held further stably.

The embodiment described above may be modified as follows.

In the embodiment described above, the cut-and-raised strip 46 of the upper rail 4 and the cut-and-raised strip 41 of the lower rail 3 which can engage the cut-and-raised strip 46 may be arranged only on one side in terms of the widthwise direction.

In the embodiment described above, a separate stopper (a plate-shaped stopper, a bolt head, etc.) which can engage the cut-and-raised strip 46 may be employed instead of the cut-and-raised strip 41 formed on the lower rail 3.

In the embodiment described above, the recess arranged at the center portion of the extending portion 55 in terms of the widthwise direction may be a U-shaped groove.

In the embodiment described above, a rivet may be employed as the tightening member.

In the embodiment described above, it may be a cover to be mounted at the end portion of the lower rail 3 in terms of the longitudinal direction. In this case, the cut-and-raised portions (cut-and-raised strips) may be disposed at both end portions of the lower rail 3 in terms of the longitudinal direction, and the stopper portion (cut-and-raised strip) may be provided at the center portion of the upper rail 4 in terms of the longitudinal direction.

In the embodiment described above, the cover may be mounted at both end portions of the rail in terms of the longitudinal direction or may be mounted one of the end portions thereof.

In the embodiment described above, the "projecting portions" are the cut-and-raised strips 46 (cut-and-raised portions) formed by cutting and raising parts of the upper rail 4 at the end edges of the opening formed at the distal end portions of the side wall portions 14 of the upper rail 4 (second rail). However, the "projecting portions" do not necessarily have to be the cut-and-raised strips 46 (cut-and-raised portion), and may be restricting members attached separately to the upper rail 4.

The "projecting portions" do not necessarily have to have a function to restrict the allowable range of relative movement of the both rails 3 and 4 by engaging the cut-and-raised strips 41 (stopper portions) formed on the lower rail 3 (first rail), and may be separate functional members projecting from the end edges of the opening formed by the distal end portions of the side wall portions 14 of the upper rail 4 in the widthwise direction. Specifically, a mounting bracket for attaching a lock member for fixing the relative position of the both rails 3 and 4 by restraining the sliding movement of the upper rail 4 with respect to the lower rail 3 to the upper rail 4, or a terminal end portion of a lock spring for urging the lock member are exemplified.

In the embodiment described above, the cross-sectional shape of the lower rail 3 is shown simply as an example. For example, the folded-back wall portions 13 may be protruded outward in terms of the rail width direction.

In the embodiment described above, the cross-sectional shape of the upper rail 4 is shown simply as an example. For example, the folded-back wall portions 16 may be protruded inward in terms of the rail width direction. The cross section of the rail of the upper rail 4 is not limited to the U-shape, but may be an inverted T-shape, for example.

In the embodiment described above, the positional relation between the lower rail 3 and the upper rail 4 may be upside down. In other words, a configuration in which the upper rail 4 is fixed to the vehicle-floor and the lower rail 3 is fixed to the seat cushion is also applicable.

In the embodiment described above, the lower rail 3 and the upper rail 4 (vehicle seat sliding apparatus) may be adapted to be disposed one each or three or more each for the seat cushion.

The direction of movement of the seat in association with the movement of upper rail 4 with respect to the lower rail 3 may be, for example, the fore-and-aft direction or the widthwise direction of the vehicle.

Subsequently, the technical idea understood from the embodiment and other examples described above will be added below.

A vehicle seat sliding apparatus including:
a first rail adapted to be fixed to either one of a vehicle-floor and a seat cushion; and
a second rail adapted to be fixed to the other of the vehicle-floor and the seat cushion and connected so as to be slidable relatively with respect to the first rail;
the first rail including:
a pair of first side wall portions arranged in parallel on both sides in terms of the widthwise direction;
a first connecting wall portion connecting proximal ends of the both first side wall portions on the side apart from the second rail;

first folded-back wall portions protruding in the widthwise direction from distal ends of the both first side wall portions respectively, and then folded back toward the proximal end sides of the first side wall portions; and a stopper portion, the second rail including:

a pair of second side wall portions arranged in parallel on both sides in terms of the widthwise direction;

a second connecting wall portion connecting proximal ends of the both second side wall portions on the side apart from the first rail;

a pair of second folded-back wall portions protruding on both sides in the widthwise direction from distal ends of the both second side wall portions respectively, and then folded back so as to be surrounded by the first side wall portions and the first folded-back wall portions; and cut-and-raised portions provided at end edges of an opening formed at distal end portions of the side wall portions at both ends of a position where the stopper portion is provided in terms of the longitudinal direction so as to project between the both second side wall portions in terms of the widthwise direction so as to restrict the allowable range of relative movement between the first and second rails by engaging the stopper portions in association with the relative movement of the first and second rails; and a cover adapted to be mounted on the second rail and to close a terminal end of the second rail, wherein the cover includes an extending portion extending to a portion where the cut-and-raised portions are formed in the longitudinal direction of the second rail and projecting toward the opening to distal ends of the cut-and-raised portions in terms of the direction of opening of the second rail.

According to one embodiment of the invention, exposure of the distal ends (edges) of the projecting portion is restrained by the extending portion.

According to one embodiment of the invention, since the center portion of the extending portion in terms of the widthwise direction is retracted to the side opposite from the opening of the second rail (to the side of the connecting wall portion, that is, the side apart from the first rail), the both sides of the recess in terms of the widthwise direction projects sufficiently toward the opening of the second rail while restraining interference between the head portion of the tightening member which can be opposed to, the opening, so that the exposure of the distal ends of the both cut-and-raised portions can be restrained reliably.

According to one embodiment of the invention, since the distal end surface of the terminal end of the second rail is covered with the cover portion, the appearance is improved. Also, since the pair of engaging portions engage the both side wall portions, the cover can be held further stably.

According to one embodiment of the invention, there is provided the vehicle seat sliding apparatus in which the exposure of the projecting portions provided on the rail is restrained, and the interference with the peripheral components can be restrained further reliably.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus comprising:
   a first rail fixed to either one of a vehicle-floor and a seat cushion;
   a second rail fixed to the other of the vehicle-floor and the seat cushion and connected to the first rail so as to be movable relatively therewith, the second rail being provided with a pair of side wall portions arranged in parallel on both sides in terms of the widthwise direction and a connecting wall portion being opposed to the first rail in terms of the vehicle height direction and connecting proximal ends of the side wall portions apart from the first rail;
   a projecting portion provided at an end portion of the second rail in terms of the longitudinal direction at an end portion of an opening formed by distal end portions of the side wall portions so as to project between the side wall portions in terms of the widthwise direction of the second rail; and
   a cover mounted on the second rail and closes a terminal end of the second rail,
   wherein the cover includes an extending portion extending to a portion where the projecting portion is formed in the longitudinal direction of the second rail and projecting toward the opening to a distal end of the projecting portion in terms of the direction of opening of the second rail,
   the first rail includes a stopper portion, and
   the projecting portion restricts the allowable range of relative movement between the first and second rails by engaging with the stopper portion in association with the relative movement of the first and second rails.

2. The vehicle seat sliding apparatus according to claim 1, wherein
   the projecting portion is a cut-and-raised portion.

3. The vehicle seat sliding apparatus according to claim 2, wherein
   the second rail includes a pair of the cut-and-raised portions on both sides in terms of the widthwise direction,
   the first rail is fixable to the vehicle-floor by a tightening member arranged at a center portion opposing a portion between the cut-and-raised portions in terms of the widthwise direction, and
   the extending portion includes a recess depressed at a center portion in terms of the widthwise direction on the side opposite from the direction of the opening of the second rail.

4. The vehicle seat sliding apparatus according to claim 1, wherein
   the cover includes:
   a cover portion which covers a distal end surface of the terminal end of the second rail and including the extending portion interposed between the side wall portions and projected in the longitudinal direction of the second rail, and
   a pair of engaging portions projecting from the extending portion outward on both sides in terms of the widthwise direction and engage the side wall portions.

5. The vehicle seat sliding apparatus according to claim 1, wherein
   the stopper portion is a cut-and-raised portion which projects in the widthwise direction of the first rail at a predetermined angle.

6. The vehicle seat sliding apparatus according to claim 4, wherein the side wall portions each include a lock hole in which the pair of engaging portions of the cover engage the side wall portions.

* * * * *